United States Patent [19]

VanGaalen

[11] 3,746,166
[45] July 17, 1973

[54] FISH EGG SORTING APPARATUS FOR SEPARATING SMALL EGGS FROM LARGER EGGS

[76] Inventor: Neil VanGaalen, P.O. Box 578, Glenwood Springs, Colo. 81601

[22] Filed: Aug. 21, 1972

[21] Appl. No.: 282,359

[52] U.S. Cl. .................. 209/74, 209/75, 209/87, 209/96, 209/111.7
[51] Int. Cl. .................. B07c 3/04, B07c 5/342
[58] Field of Search ............. 209/74, 75, 111.6, 209/111.7, 87, 96

[56] References Cited
UNITED STATES PATENTS

| | | | |
|---|---|---|---|
| 1,443,524 | 1/1923 | Carter | 209/96 |
| 1,907,448 | 5/1933 | Schmidt | 209/96 |
| 3,613,884 | 10/1971 | VanGaalen | 209/111.6 |

*Primary Examiner*—Richard A. Schacher
*Attorney*—Bertha L. MacGregor

[57] ABSTRACT

Fish egg sorting apparatus for separating small eggs from larger eggs comprising a water and egg compartment and a rotated disc partially immersed in the water in the compartment, the disc having a series of tapered holes extending from front to rear faces adjacent the disc periphery. The smaller diameter areas of the tapered holes are capable of holding small eggs in wedged positions therein. Pressurized air streams blow larger eggs out of the holes into a compartment, and blow small eggs out of wedged positions into another compartment. The disc is provided with an annular series of small holes extending through the disc located radially between the axis and periphery of the disc for passage of water from the water and egg compartment to maintain a predetermined level in the compartment. The invention may be embodied in sorting apparatus which separates dead eggs from live eggs before pressurized air is directed against live eggs for separating small eggs from larger eggs by this invention.

6 Claims, 7 Drawing Figures

Patented July 17, 1973 3,746,166

Patented July 17, 1973

FISH EGG SORTING APPARATUS FOR SEPARATING SMALL EGGS FROM LARGER EGGS

This invention relates to fish egg sorting apparatus for separating small eggs from larger eggs. The invention may be embodied in a fish egg sorting machine which separates dead fish eggs from live eggs, such as the machine shown and described in my U.S. Pat. No. 3613,884, but may be embodied in apparatus designed only for separating small eggs from larger eggs.

In this application, the invention has been shown and described as embodied in apparatus capable of separating small eggs from larger eggs and also capable of separating dead eggs, which are opaque, from live eggs, which are transparent. The main object of the invention is to provide apparatus which is exceptionally speedy in operation, coupled with accuracy in making the separations. The apparatus as shown herein utilizes a rotated disc provided with egg holes whereby eggs are sorted for separating dead from live eggs, and the remaining live eggs are sorted by separating the larger eggs from small eggs.

The need for separation of small eggs from larger eggs is explained as follows: In fish culture practices, when young fish, particularly trout, reach about two inches in length they are sorted over a grate or series of bars and divided into lots of uniform size. This enables the fish in each lot to compete better for feed and it also reduces cannibalism. Small eggs produce small fry and the larger eggs produce larger fry. One of the most critical periods in trout or salmon culture is the time when these small fish compete with the larger ones for feed. Often the small fish die, or cannibalism takes its toll. Due to the small size of the fish at this crucial time, it is almost impossible to sort them. This problem could be avoided if the small eggs were separated from larger eggs prior to hatching.

To achieve the main object of my invention of separating small eggs from larger eggs speedily and accurately, I have discovered that by providing a rotating disc with conical shaped or tapered holes in place of the prior art uniform diameter holes, small fish eggs become wedged in the holes while larger fish eggs fall back into the water-egg compartment for lack of support in the tapered holes. To produce the desired wedging of the small eggs in the tapered hole, it was discovered that water pressure must be maintained against the face of the rotating disc in the water compartment. An inflow of water into the water compartment has been provided by a water intake conduit leading to the water-egg compartment, and an annular series of small holes in the rotated disc located so the lower part of the series provides for through-flow and maintains the predetermined water level in the compartment. This arrangement causes movement of water and eggs toward the face of the disc, causing small eggs to become wedged in the tapered holes, and permitting overflow water to pass through the series of small holes in the rotating disc without the holes becoming clogged. A simple outlet has been found not to be practical because it becomes clogged with fish eggs and results in overflow of water from the water-egg compartment.

Fish eggs vary in size and shape; they are not all truly spherical. The variation can best be understood by reference to diameters and number of eggs per ounce:

0.150 inch or 625 eggs per ounce 0.160 inch or 500 eggs per ounce 0.200 inch or 240 eggs per ounce 0.260 inch or 200 eggs per ounce 0.320 inch or 50 eggs per ounce I have determined that conical shaped tapered holes in the rotated disc, capable of receiving and holding small eggs and allowing larger eggs to fall back into the water-egg compartment, for sorting eggs within a wide range of sizes, preferably are one-half inch diameter at the base or entrance of the hole and three thirty-seconds inch diameter at the apex of the hole, located in a three-eighths inch thick disc. However, the size and proportions of the disc and holes may be varied, the object of the selection being to provide tapered holes capable of receiving and having wedged therein the small eggs that are to be separated from the larger eggs. Obviously discs of varying dimensions, with holes shaped and sized to accommodate the fish eggs to be sorted, may be employed in apparatus embodying the invention.

Figure 1:
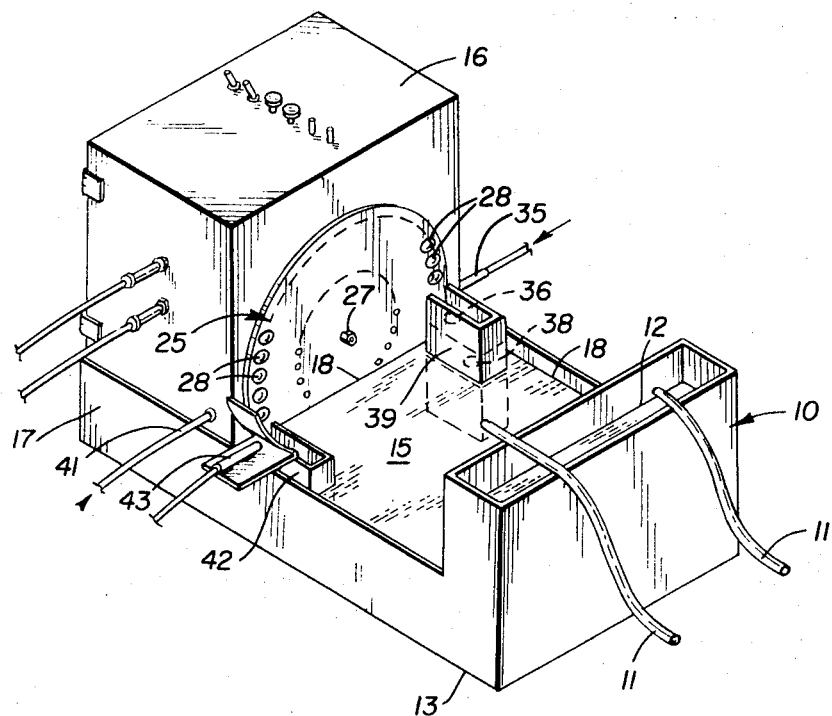
FIG. 1 is a perspective view of fish egg sorting apparatus embodying my invention.
Figure 2:
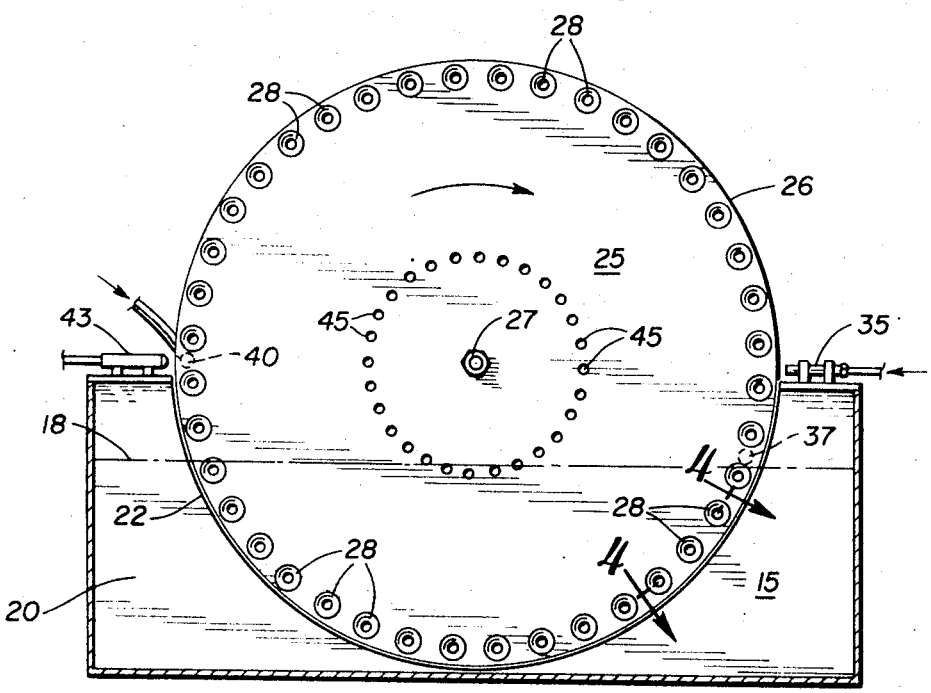
FIG. 2 is an elevational view showing the front face of the rotating egg carrying disc and the cradle located beneath the disc, on an enlarged scale.
Figure 3:
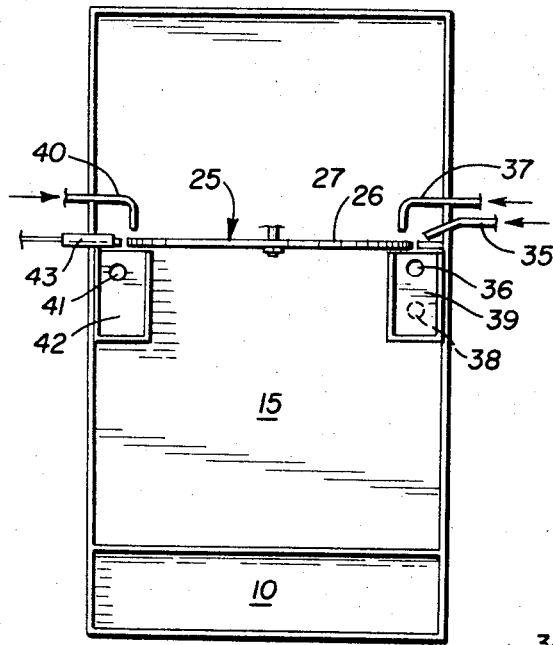
FIG. 3 is a top plan view of the water reservoir, the water and egg compartment, the rotating disc and rearward compartment.

In the embodiment of the invention shown in the drawings, particularly FIGS. 1–3, the fish egg sorting apparatus comprises a water reservoir 10 located in the front end of the apparatus provided with water input means 11 to maintain a water level indicated at 12 in FIG. 1. The water reservoir extends downwardly to the bottom 13 and has openings in its inner wall for passage of water into the egg and water compartment 15. An electrical control cabinet 16 is located on a support 17 rearwardly of the egg and water compartment 15. The water level in the egg and water compartment is indicated at 18. Within the egg and water compartment 15 is an assembly extending transversely of the compartment, consisting of a backplate 20 and cradle 22, as shown in FIG. 2. The cradle 22 is arcuate in shape and has an upper arcuate surface which fits closely below the peripheral edge of a rotated egg-carrying disc 25. The disc 25 is made of transparent material, circular in shape, having parallel front and rear major surfaces and a peripheral edge 26. The disc is mounted on a horizontal shaft 27 driven by a motor (not shown) in the cabinet 16. The disc is located to be partially within the water-egg compartment.

Figure 5:
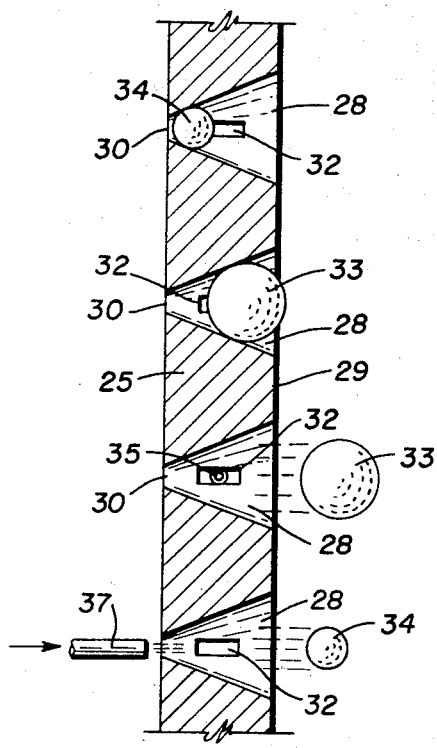
FIG. 5 is a view similar to FIG. 4 showing the location of air jet slots in the rotating disc communicating with each of the tapered holes.
Figure 4:
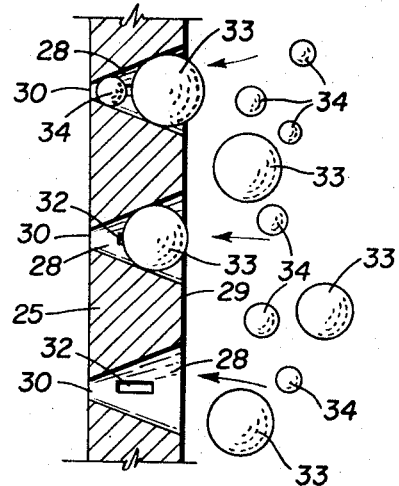
FIG. 4 is an enlarged sectional view of a segment of the egg carrying disc, in the plane of the arcuate line 4—4 of FIG. 2, showing eggs of different sizes in and adjacent to the tapered holes in the rotating disc.

The disc is provided adjacent its peripheral edge 26 with a plurality of holes 28 equidistantly spaced apart around the entire circumference of the disc. In a disc 12 inches in diameter, approximately 100 holes 28 may be provided. The holes 28 extend through the disc from one major surface to the other, and are conical or tapered in shape. As shown in FIGS. 4 and 5, the holes 28 have their entrances open to the front face 29 of the disc and the apexes open to the rear face 30 of the disc 20. Each hole 28 has a slot 32 therein communicating with an air passage through the disc leading to a source of pressurized air for blowing an air jet against larger eggs 33 that have entered holes 28 either separately as in FIG. 5 or next to a small egg 34 as in FIG. 4. The large egg removal air jet 35 blows continuously against the disc 20 at a certain place, as indicated at 35 in FIG. 3, to move the large egg 33 out of a hole through the large egg exit hole 36 and into a receiving compartment for large eggs. Small eggs 34, wedged in the tapered hole adjacent the apex are blown out by a small egg removal air jet 37 to move the small egg 34 through the small egg exit hole 38 and into a receiving compartment for small eggs. Both compartments may be located in a compartment 39 divided for this purpose.

It will be understood that before the air jets 35 and 37 function to separate small eggs from larger eggs, dead eggs will have been separated from live eggs and removed from the disc by the scanning means and air jets described in my aforesaid U.S. Pat. No. 3613,884. In FIG. 3 of this application, the dead egg removal air jet is indicated at 40, the dead egg exit hole 41, and the dead egg compartment at 42. The dead egg sensor 43 is shown in FIG. 1, adjacent the dead egg removal air jet 40 shown in FIGS. 2 and 3. The dead egg separating means preferably is part of the sorting apparatus of this application, functioning to remove dead eggs from the rotating disc 20 before the separation of large and small good eggs takes place, but of course the sorting for size may be performed independently.

As previously noted, the wedging of small eggs 34 in the smaller diameter areas of the holes 28 is effected by the flow of water and eggs toward the face of the disc 20, the water being slightly under pressure due to the flow from the reservoir 10. To prevent overflow in the water and egg compartment 15 and also to maintain circulation of the water, an annular series of small holes 45 is provided in the disc 20 as shown in FIGS. 1 and 2, the holes being located about three inches radially from the periphery of a 12 inch disc so that the holes 45 coincide with the predetermined water level 18 in the compartment 15 as the disc rotates about its axis 27.

Figure 6:
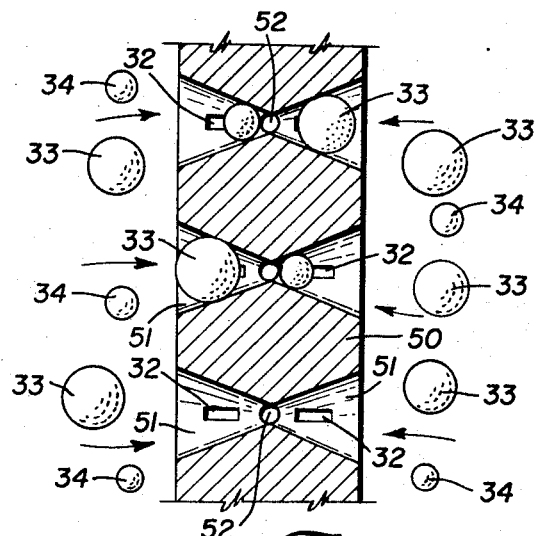
FIG. 6 is a view similar to FIG. 4 but showing double tapered holes instead of the single holes of FIG. 4.

In FIG. 6, a double hole arrangement is shown in a disc 50 of greater thickness than the disc 20, with conical or tapered holes 51 opening in opposite directions. The function of the holes 51 is the same as the previously described holes 28, with means for blowing out larger eggs 33, followed by blowing out of small eggs 34 wedged in the apexes of the holes through air holes 52.

Figure 7:
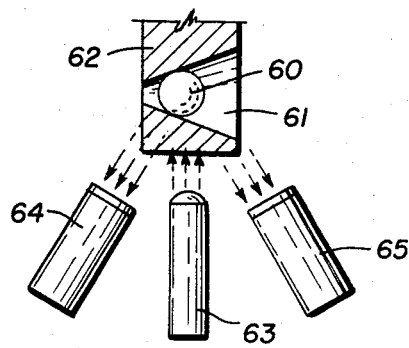
FIG. 7 is a diagrammatic view illustrating the preferred location of a light source and photo cell sensor for detecting dead eggs.

FIG. 7 shows a dead egg 60 in a tapered hole 61 in a disc 62. Adjacent the periphery of the disc is a dead egg scanner or light source 63 that transmits light rays to the dead egg 60. Since the dead egg is opaque, it will transmit reflected light rays to a photoelectrical cell located at an appropriate angle relatively to the scanner. I have noted in my experiments that a photoelectrical cell 64, located to the left of FIG. 7, receives a very strong signal when a dead egg is scanned, whereas a photoelectrical cell 65, located to the right of FIG. 7, receives a very weak signal under the same conditions. It is believed that the location and angles of the surfaces of the tapered hole may account for this. The photoelectrical cell 64 has a light receiving surface generally parallel to the tapered wall of the hole between the dead egg and the cell.

The invention of the means for separating small eggs from larger eggs may be utilized for separating eggs which have been prepared for bait. For this purpose, of course, the apparatus need have no provision for separating dead eggs from live eggs.

I claim:

1. Fish egg sorting apparatus for separating small eggs from larger eggs comprising
   a. a rotated disc provided with a series of tapered holes which extend through the disc from its front to rear faces adjacent the peripheral surface, the smaller diameter areas of the tapered holes being capable of holding small eggs in wedged positions therein,
   b. air jet openings in the holes located between the hole entrance and its smaller diameter area for receiving pressurized air for blowing larger eggs out of the hole, and
   c. an air jet directed against the disc for blowing out small eggs wedged in the holes.

2. Fish egg sorting apparatus defined by claim 1, which includes a water and egg compartment open at its top in which the disc is partially submerged, and in which the rotated disc is provided with small holes extending through the disc in an annular series located radially between the axis and periphery of the disc for passage of water from the water and egg compartment above a predetermined water level.

3. Fish egg sorting apparatus defined by claim 1, in which the holes in the disc are conical in shape, with their largest diameter opening flush with the front surface of the disc.

4. Fish egg sorting apparatus defined by claim 1, in which the tapered holes are double holes having adjacent apexes and an air opening between them.

5. Fish egg sorting apparatus defined by claim 1, which includes means for separating dead eggs from live eggs located relatively to the disc to perform the separation before pressurized air is directed against live eggs for separating small eggs from larger eggs.

6. Fish egg sorting apparatus defined by claim 5, in which the means for separating dead eggs from live eggs comprises a light source directed against a dead egg in a tapered hole and a photoelectric cell located to receive light reflected by the dead egg, said cell having a light receiving surface generally parallel to the tapered wall of the hole between the dead egg and the cell.

* * * * *